United States Patent [19]

Ransom

[11] Patent Number: 4,675,135
[45] Date of Patent: Jun. 23, 1987

[54] ENGINE INTAKE SYSTEM WITH DECELERATION VALVE

[75] Inventor: Keith C. Ransom, Benfleet, United Kingdom

[73] Assignee: Ford Motor Company, Dearborn, Mich.

[21] Appl. No.: 914,846

[22] PCT Filed: Dec. 4, 1985

[86] PCT No.: PCT/GB85/00550
§ 371 Date: May 23, 1986
§ 102(e) Date: May 23, 1986

[87] PCT Pub. No.: WO86/03559
PCT Pub. Date: Jun. 19, 1986

[30] Foreign Application Priority Data

Dec. 5, 1984 [GB] United Kingdom ................ 8430733

[51] Int. Cl.[4] ............................................. F02M 7/12
[52] U.S. Cl. ...................................... 261/56; 123/327; 261/DIG. 19
[58] Field of Search ................ 261/DIG. 19, 56; 123/327

[56] References Cited

U.S. PATENT DOCUMENTS

| | | | |
|---|---|---|---|
| 2,443,465 | 6/1948 | Leibing | 261/DIG. 19 |
| 4,098,850 | 7/1978 | Tamura | 261/DIG. 19 |
| 4,122,806 | 10/1978 | Bockelmann et al. | 261/DIG. 19 |
| 4,194,477 | 3/1980 | Sugiyama | 261/DIG. 19 |
| 4,297,984 | 11/1981 | Kawabata | 123/327 |
| 4,434,778 | 3/1984 | Morita et al. | 123/327 |
| 4,494,505 | 1/1985 | Naramura | 123/327 |

FOREIGN PATENT DOCUMENTS

| | | |
|---|---|---|
| 2612951 | 6/1977 | Fed. Rep. of Germany . |
| 55-117058 | 9/1980 | Japan . |
| 58-187571 | 1/1983 | Japan . |
| 1507058 | 12/1978 | United Kingdom . |

*Primary Examiner*—Tim Miles
*Attorney, Agent, or Firm*—Robert E. McCollum; Clifford L. Sadler

[57] ABSTRACT

A engine intake system includes a deceleration valve (10) which is biased in one direction by idle vacuum and in the opposite direction by manifold vacuum. Idle vacuum is admitted to and stored in a pressure chamber (30) in the valve each time the engine idles. When the engine is not idling, manifold vacuum is admitted to another pressure chamber (28) in the valve. A diaphragm (24) separates the two chambers and is connected to a valve member (18) which opens and closes the deceleration passage (12).

5 Claims, 5 Drawing Figures

ENGINE INTAKE SYSTEM WITH DECELERATION VALVE

This invention relates to an engine intake system incorporating a deceleration valve.

A deceleration valve is used to allow sufficient air to reach the engine when the throttle is closed with the engine running at speed, i.e. when the engine has to decelerate. Under these conditions, the mixture trapped in the manifold is fuel rich, and this may lead to undesirably high hydrocarbon emissions on deceleration. The use of a deceleration valve to admit air to the engine under these conditions can held to reduce these emissions.

In conventional deceleration valves, manifold vacuum works on a diaphragm, in opposition to a spring. Such valves have been found to be unreliable in that they have a tendency to stick.

According to the present invention, there is provided an engine intake system, engine, including a carburettor, a deceleration valve having a valve member operative to open and close a deceleration passage which bypasses the main air passage through the carburettor, and a housing divided by a diaphragm into two pressure chambers, one chamber being supplied with manifold vacuum and the other chamber being supplied with idle vacuum, and an auxiliary valve connected in the inlet to said other chamber and adapted to admit vacuum when the engine is idling, and to trap idle vacuum in the chamber when the engine is not idling, the valve member being connected to the diaphragm so that movement of the diaphragm opens and closes the deceleration valve.

The use of two pressure chambers means that diaphragm movement is always positive because the diaphragm is biassed from both sides. In addition, the valve automatically sets itself to close at the correct vacuum level as the idle vacuum which acts to tend to close the valve is reset each time the engine returns to idle.

The valve may include biassing means, such as a helical spring, for biassing the diaphragm in the direction of one of the chambers.

The auxiliary valve may be a two-position, three-port valve with a first port permanently connected to manifold vacuum, a second port connected to the inlet to said one chamber and the third port connected to the inlet to said other chamber. The auxiliary valve can be controlled so that it takes up one end position when the engine is idling, and an opposite end position at other times. When the engine is idling, manifold vacuum (which is idle vacuum at this stage) is passed to said other chamber. When the engine is not idling, manifold vacuum is passed to said one chamber and idle vacuum is trapped in said other chamber.

The auxiliary valve can be controlled by spark port vacuum which is zero when the carburettor butterfly is closed, but which rises to a high valve as soon as the butterfly is opened. A vacuum sustain valve can be placed between the vacuum spark port and the auxiliary valve, to prevent the auxiliary valve from switching as soon as the spark port vacuum drops.

The invention will now be further described, by way of example, with reference to the accompanying drawings, in which.

Figure 2:
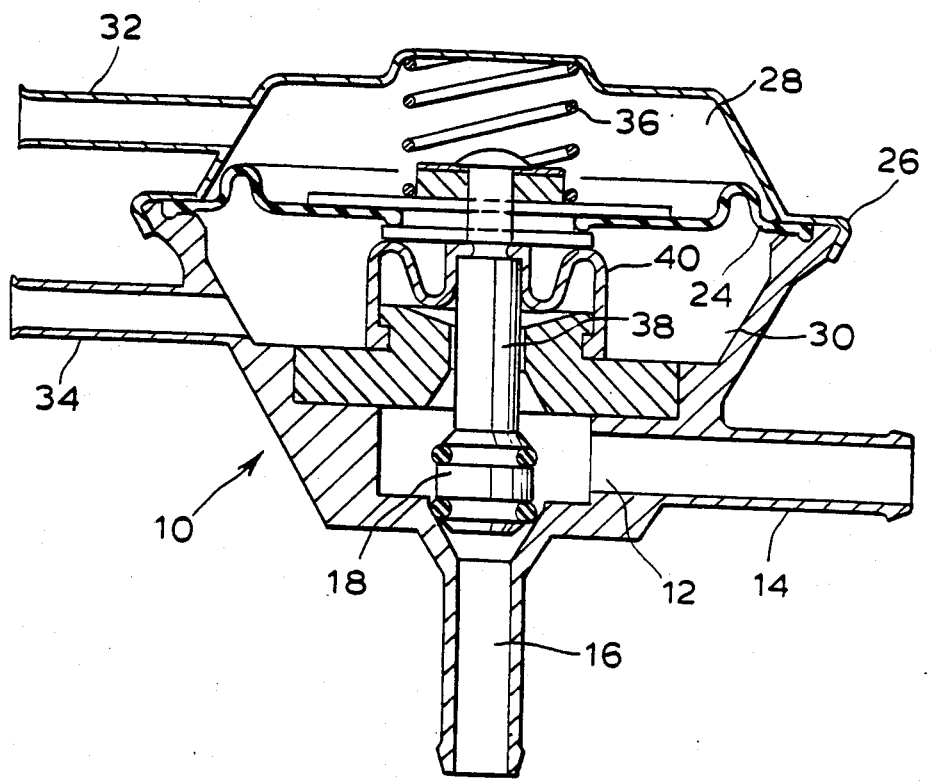
FIG. 2 is a section through the deceleration valve of FIG. 1.

A deceleration valve 10 has a passage 12 (see FIG. 2) for bypass air. The passage has an inlet 14 connected to a carburettor and an outlet 16 connected to an intake manifold. A valve member 18 sits in the passage and can open, close or throttle the passage 12.

The passage 12 bypasses the air passage through the barrel 20 of a carburettor to which it is fitted. When the throttle butterfly 22 is closed, air can still reach the engine intake manifold through the valve 10, if the passage 12 is open. This happens if the driver takes his foot off the accelerator while the engine is running at speed.

The valve member 18 is connected to a diaphragm 24 which divides a housing 26 into two pressure chambers, 28 and 30. Each chamber has an inlet and these inlets are indicated at 32 and 34 respectively. The upper or first chamber 28 is closed by the diaphragm 24 and contains a spring 36 which acts downwardly on the diaphragm (in opposition to vacuum in this chamber which acts to pull the diaphragm upwardly). The characteristics of the spring 36 may be altered to tune the operation of the valve, or the spring may be omitted.

The lower or second chamber 30 is closed at the top by the diaphragm 24 and has an opening through which a stem 38 of the valve member 18 extends. This opening is sealed by a sealing boot 40. Vacuum in this chamber acts to pull the diaphragm downwardly, i.e. in the same direction as the spring 36.

Figure 1:
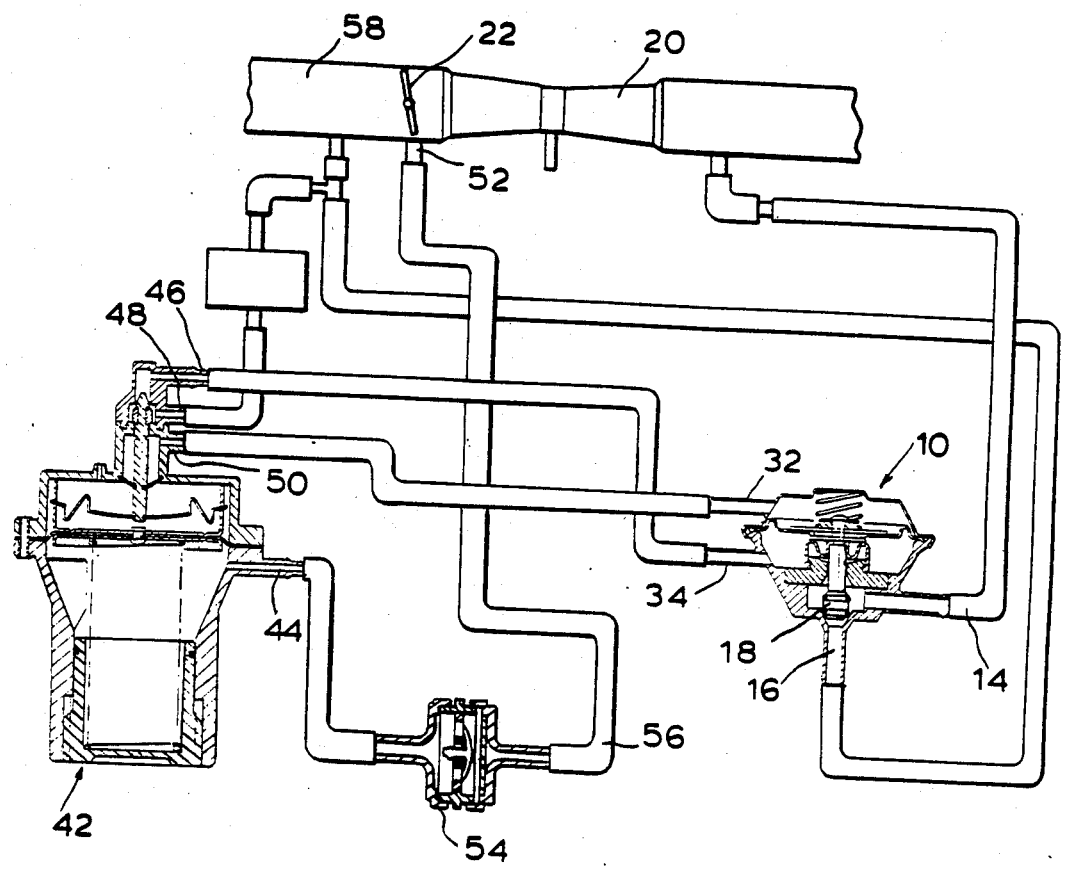
FIG. 1 is a schematic view of a deceleration valve and a control valve in accordance with the invention.

The arrangement shown in FIG. 1 couples this deceleration valve with an auxiliary valve 42 which is described in more detail in U.S. Ser. No. 805,493, filed on Dec. 5, 1985. This valve has a control port 44 and three function ports 46, 48, 50. The valve can either connect port 46 to port 48 and close port 50 or connect port 48 to port 50 and close port 46. Manifold vacuum will normally be connected to port 48.

Figure 5:
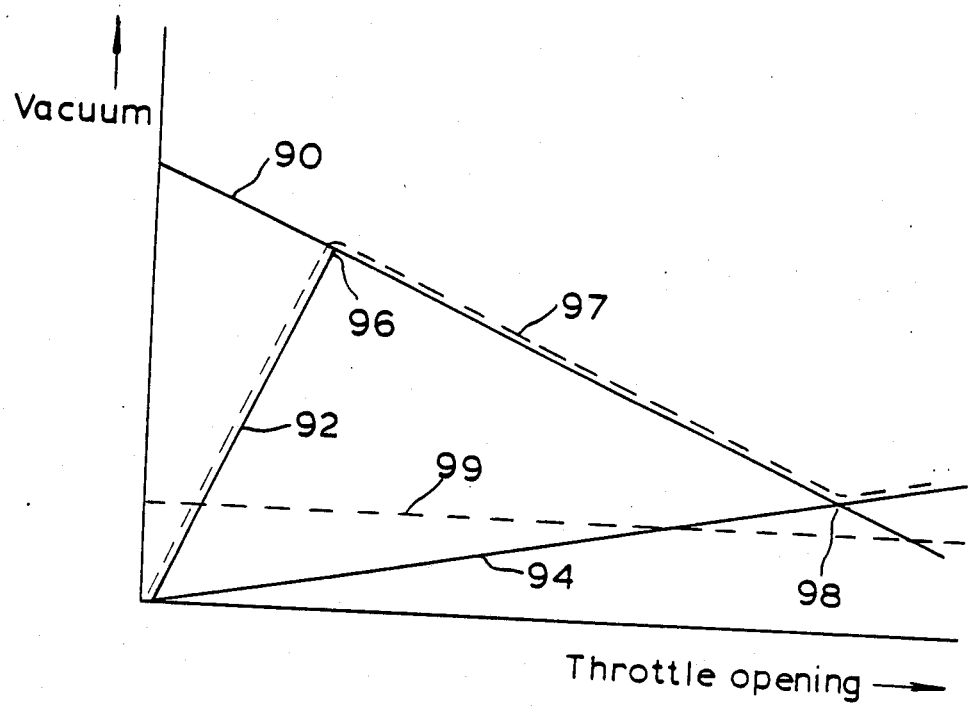
FIG. 5 is a graph showing how various vacuum levels change with throttle angle.

The auxiliary valve 42 is controlled by vacuum from the spark port 52 of the carburettor on which the unit is installed. This port is covered by the edge of the butterfly 22 when the butterfly is closed, but is open as soon as the butterfly is opened. Vacuum at this port rises very rapidly when the butterfly is opened, and this is illustrated in FIG. 5 by the line 92. A vacuum peak is quickly reached, and thereafter the vacuum level drops. At idle, the butterfly will be closed and there will be no vacuum at the spark port. The variation in manifold vacuum with the throttle opening angle is shown by the line 90.

This spark port vacuum is used to operate the auxiliary valve 42 through the control port 44. When the engine is idling, there will be no vacuum at the port 52 and no vacuum at the port 44. An internal spring in the valve 42 will push upwards on a diaphragm, the diaphragm being connected by an overcenter spring to a two-position valve member, which because of the overcenter position of the spring, moves in an opposite (downward) direction to open communication between function ports 46 and 48. Thus manifold vacuum at idle (idle vacuum) is admitted to the inlet 34 of the chamber 30, as described more fully in U.S. Ser. No. 805,493.

When the butterfly 22 is opened, spark port vacuum will appear and will pass to the lower chamber of the valve 42. The diaphragm in this valve is pulled down, against spring pressure. This causes the overcenter spring to snap overcenter, moving the two-position valve member upwards (in the opposite direction to diaphragm movement) to open communication between ports 48 and 50 and to close port 46. Manifold vacuum is thus admitted to the inlet 32 of the chamber 28, and the idle vacuum in the chamber 30 is trapped, again, as more fully described in U.S. Ser. No. 805,493. During normal engine operation, manifold vacuum will be lower than idle vacuum, and the valve member 18 will remain in the closed position.

However, if the butterfly 22 is closed at a high engine speed, the manifold vacuum will rise sharply, and will exceed idle vacuum. This will then cause the diaphragm 24 and the valve member 18 to move to open the deceleration passage 12 to admit air to the engine whilst the throttle barrel 20 is closed.

As the engine gradually decelerates, the manifold vacuum will decay until it is approximately the same as the idle vacuum trapped in the lower chamber 30. When this point is reached, the valve member 18 will move again to throttle and then to close the passage. The strength of the spring 36 will determine the magnitude of the relative vacuums in the chambers 28 and 30 at which the valve member 18 will move.

If the butterfly is closed at a high engine speed, the spark port vacuum will also disappear. This could lead to the control valve switching immediately which would prevent the required direction of manifold vacuum between the chambers 28 and 30. To prevent this happening, a vacuum sustain valve 54 is placed in the duct 56 leading to the port 44. This valve comprises a sintered porous disc with a non-return valve in it. When vacuum is applied to the duct 56, the non-return valve opens and air can be drawn out through the valve. When the pressure in the valve 42 is less than that in the duct 56, the non-return valve closes. Air can however bleed slowly through the porous disc so that the vacuum in the control chamber of the valve 42 decays slowly. This decay should be timed so that the valve 42 will not switch back until the engine has reached idling speed.

Figure 3:
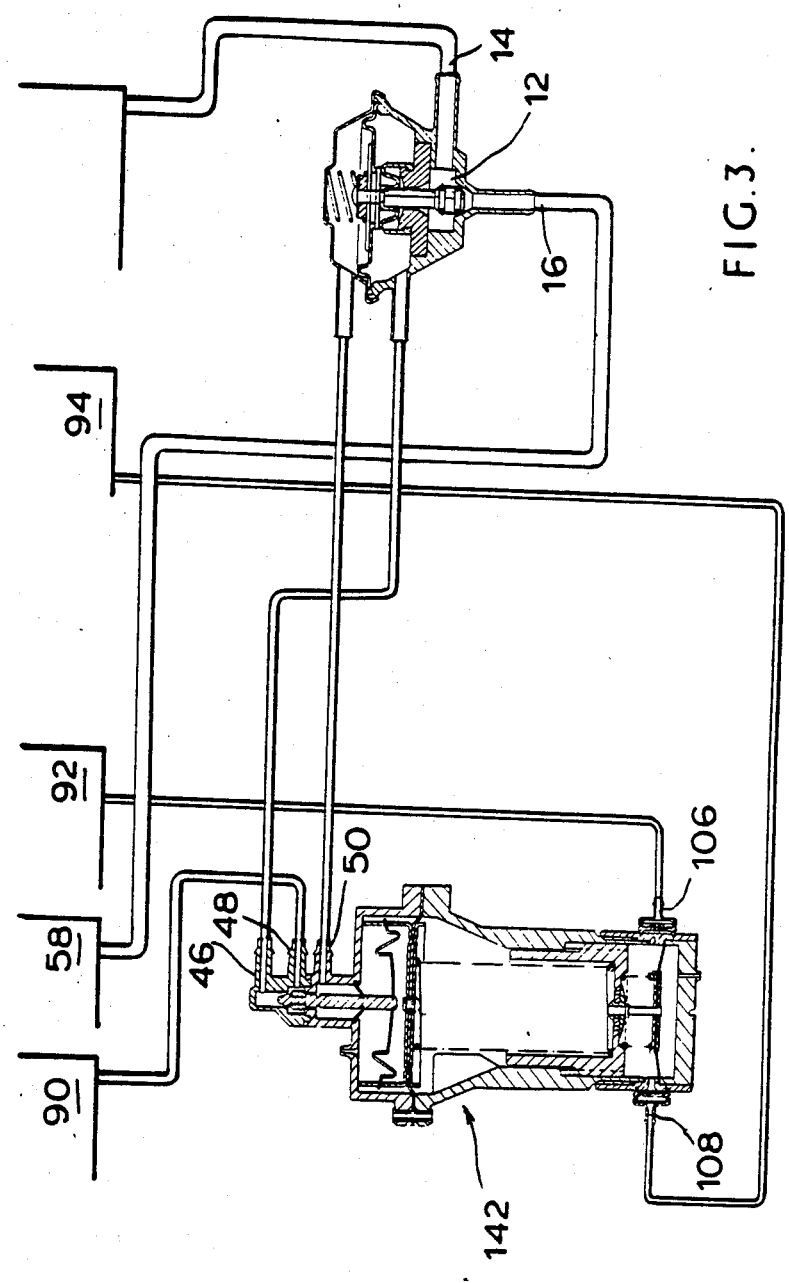
FIG. 3 shows an alternative engine intake system in accordance with the invention.
Figure 4:
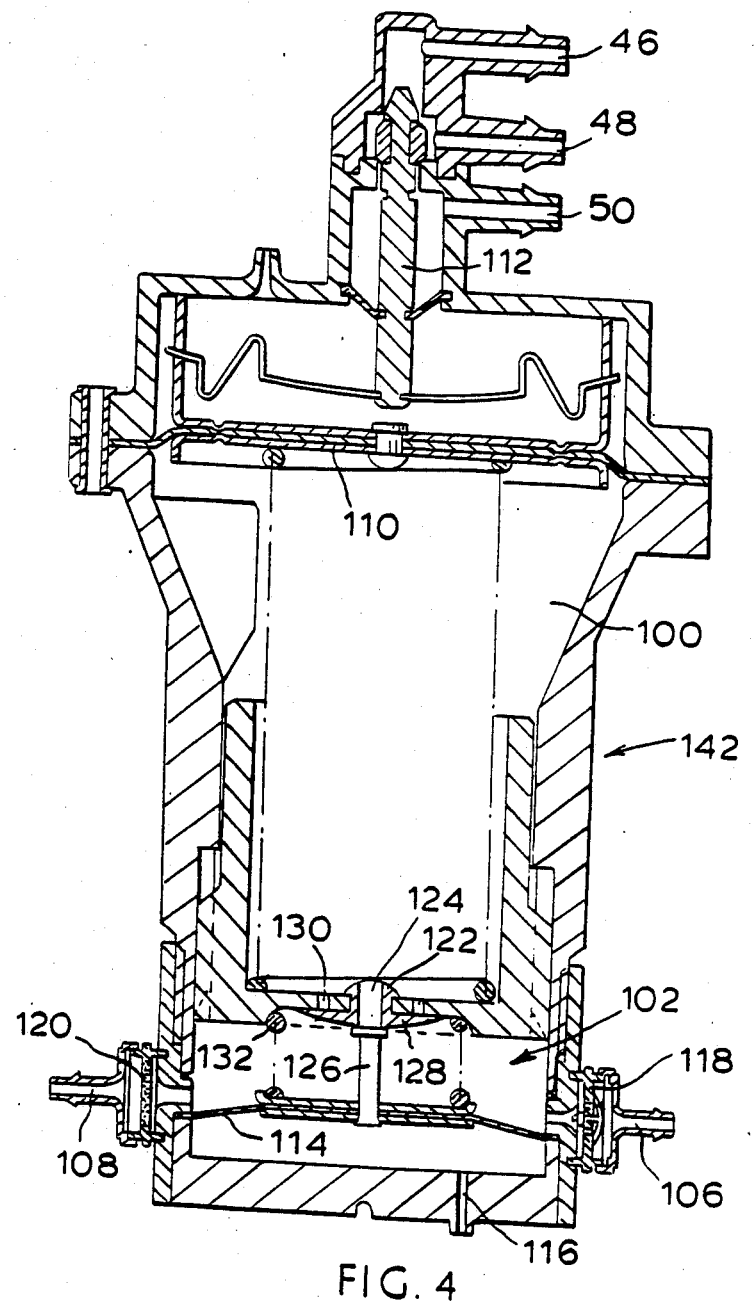
FIG. 4 is a section through an auxiliary valve for use in the system of FIG. 3.

FIGS. 3 and 4 show an alternative deceleration valve installation. The auxiliary valve 142 is shown in detail in FIG. 4, and described in U.S. Ser. No. 805,493. The valve has a main pressure chamber 100 and an auxiliary chamber 102. Spark port vacuum 104 is connected to a port 106, and venturi vacuum is connected to a port 108. When the vacuum in the main chamber 100 exceeds a certain level, a diaphragm 110 at the top of the chamber will be pulled down, and a valve member 112 will move to open communication between ports 48 and 50. When the vacuum drops, the diaphragm will rise and the valve member will open communication between the ports 46 and 48.

The auxiliary chamber 102 is bounded at its lower end by a diaphragm 114, and the underside of the diaphragm is vented to atmosphere through a vent 116. A one-way valve 118 is provided in the port 106 and a sintered disc 120 is provided in the port 108.

In the base of the main pressure chamber 100, a seal 122 is fitted in a central hole. The seal 122 itself has a hole 124 extending through it. This hole 124 can be closed by a plug 126 mounted on the diaphragm 114, when the diaphragm is in a raised position as shown in FIG. 4.

The seal 122 also has a radial skirt 128 which covers additional passages 130 through the base of the chamber 100. When the pressure in the main chamber 100 is higher than that in the auxiliary chamber 102, the skirt will be lifted away from the passages 130 by the pressure so that air can flow from the main chamber to the auxiliary chamber.

A helical spring 132 acts against a rigid disc at the centre of the diaphragm 114, and biasses the diaphragm downwardly.

The presence of the auxiliary chamber 102 and the two control ports 106 and 108 allows the valve to be made to respond to vacuum at either one of the two ports, whichever vacuum is the greater. The sintered disc 120 and the one-way valve 118 prevent the vacuum in the auxiliary chamber for decaying sharply.

The purpose of the auxiliary chamber 102 is to prevent switching of the valve at the wrong moment. FIG. 5 shows the development of vacuum in the various take-off ports as the throttle opening increases. When the throttle is closed, manifold pressure (represented by the line 90) is high, but spark port (line 92) and venturi (line 94) vacuums are low. As soon as the throttle is opened slightly, spark port vacuum rises sharply towards manifold vacuum until the two meet at a point 96, when the edge of the butterfly 22 clears the spark port. As the throttle opens still further, both vacuums fall together to a minimum level at wide open throttle.

The venturi vacuum however continues to rise and, at a point 98, first exceeds the manifold and spark port vacuums.

In FIG. 5, the vacuum level at which switching of the valve occurs is indicated by a dotted line 99. It will be seen that the valve will switch very soon after the throttle opens as a result of the rising spark port vacuum. The vacuum in the auxiliary chamber will generally follow the dotted line 97 in FIG. 5. As the throttle opening approaches its wide open position, this vacuum falls substantially with the manifold vacuum, and drops below the dotted line 99. To prevent the valve 142 from closing at this stage, venturi vacuum is also fed to the auxiliary pressure chamber 102 and this continues to rise as the manifold vacuum falls, and ensures that the vacuum in the chamber 102 is sufficient to hold the auxiliary valve open until the throttle closes again.

Thus, idle vacuum will continue to be trapped in the chamber 30 of the deceleration valve until the throttle is closed again.

I claim:

1. An engine intake system, including a carburetor having an air/fuel induction passage connected to air at one end and the engine intake manifold at the other end, a throttle valve rotatably mounted in the passage for blocking or admitting flow therethrough, an air bleed air bypass passage connected from the one end of the induction passage to the other bypassing the throttle valve to admit air to the manifold when the throttle valve is in a closed engine idle speed position to decay the manifold vacuum therein during engine decelerating conditions, a deceleration valve in the air bypass passage having a valve member operative to open and close the bypass passage, servo means to move the deceleration valve in response to changes in engine operating conditions including a housing divided by a flexible diaphragm into first and second pressure chambers each having an inlet connected to manifold vacuum, and an auxiliary control valve connected in the inlet to said second chamber and adapted to admit vacuum when the engine is idling, and to trap idle vacuum in the chamber when the engine is not idling, the valve member being connected to the diaphragm so that movement of the diaphragm opens and closes the deceleration valve, said auxiliary control valve being controllable by spark port pressure in a port in the induction passage located just upstream of the closed position of the throttle valve so as to change from atmospheric pressure to manifold vacuum as the throttle valve moves open to control a supply of manifold vacuum at various pressure levels to both the first and second chambers to effect movement of the deceleration valve, the auxiliary valve being movable from a first position at low spark port vacuum levels to connect manifold vacuum to the second chamber to maintain the deceleration valve closed, to a second position at higher spark port vacuum levels connecting higher deceleration level manifold vacuum to the first chamber to open the deceleration valve and bleed the vacuum in the manifold.

2. An internal combustion engine as claimed in claim 1 wherein the auxiliary valve is a two-position, three-port valve with a first port permanently connected to manifold vacuum, a second port being connected to the inlet to said first chamber and the third port connected to the inlet to said second chamber.

3. An engine intake system as claimed in claim 2, including spring means positioning the auxiliary valve in one end position when the engine is idling at low spark port pressure levels and an opposite end position at other times.

4. An engine intake system as claimed in claim 3, wherein a vacuum sustain valve is placed between the vacuum spark port and the auxiliary valve delaying the switching of the auxiliary valve from one end position to another until the spark port vacuum decays to a predetermined level.

5. An engine intake system as claimed in claim 3, wherein the carburetor includes a venturi between the inlet and the throttle valve, the auxiliary valve being controlled by spark port vacuum and by venturi vacuum.

* * * * *